United States Patent [19]
Dotson

[11] 4,139,270
[45] Feb. 13, 1979

[54] PANEL MOUNTING APPARATUS

[76] Inventor: James T. Dotson, Lot #109 Rancho Del Sol, Gilbert, Ariz. 85234

[21] Appl. No.: 830,564

[22] Filed: Sep. 6, 1977

[51] Int. Cl.² .................... G02B 5/10; G02B 7/18
[52] U.S. Cl. .................................. 350/296; 350/310
[58] Field of Search ............ 350/310, 296, 293, 288; 128/270, 271; 248/475 R; 52/476, 500, 501

[56] References Cited
U.S. PATENT DOCUMENTS 4,056,309  11/1977  Harbison et al. .................... 350/310

FOREIGN PATENT DOCUMENTS 1125846  9/1968  United Kingdom .................... 250/288

Primary Examiner—Jon W. Henry

[57] ABSTRACT

A guide member extends along each longitudinal edge of a concave frame. Grooves within the guide members slideably receive respective longitudinal edges of a flexible reflective panel. A lateral edge of the panel is received in the lateral guide member at one end of the frame. Retention means at the other end of the frame are detachably held against the other lateral edge of the panel by biasing means. The biasing means is yieldable in response to thermal expansion of the panel.

4 Claims, 7 Drawing Figures

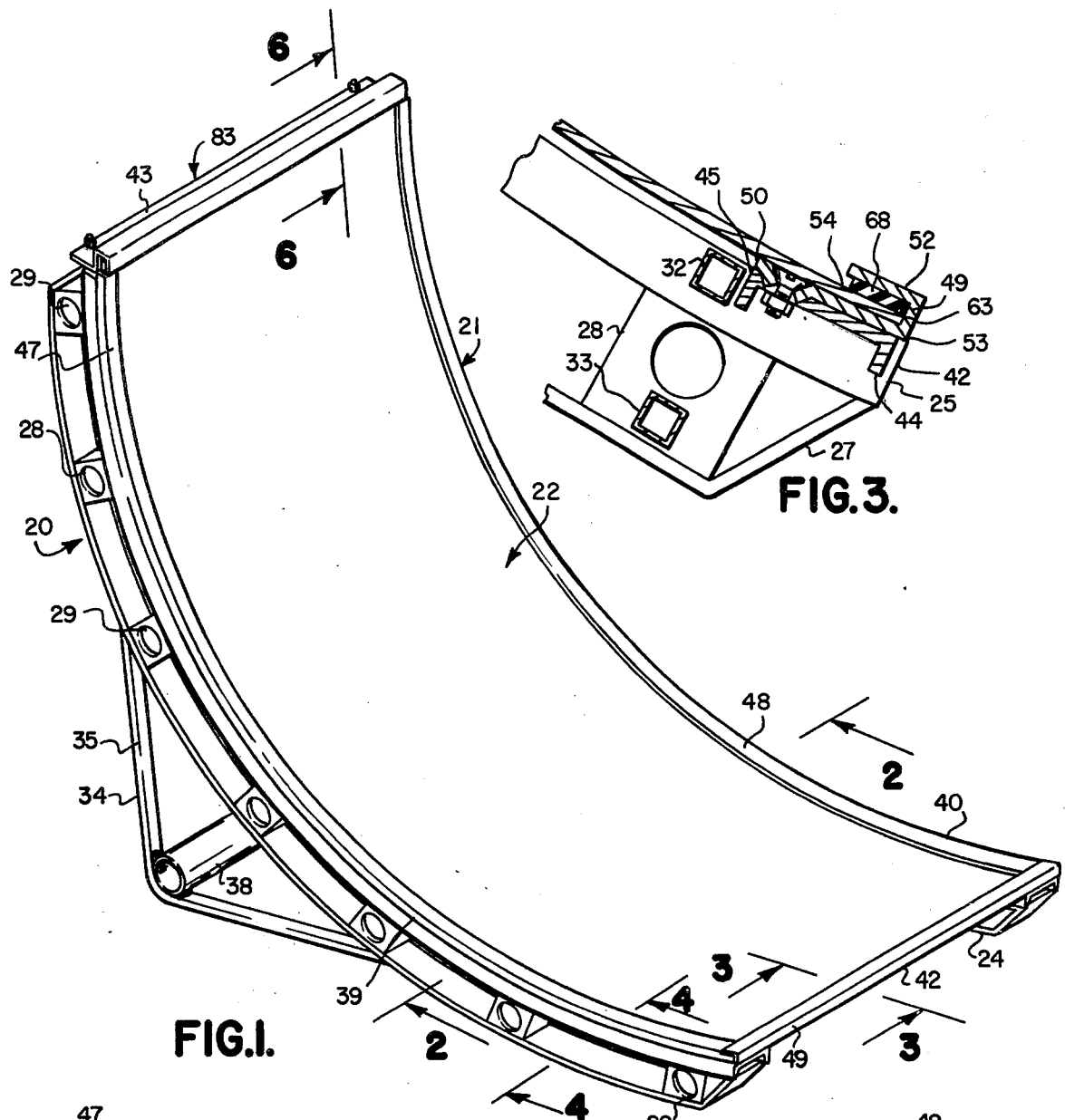
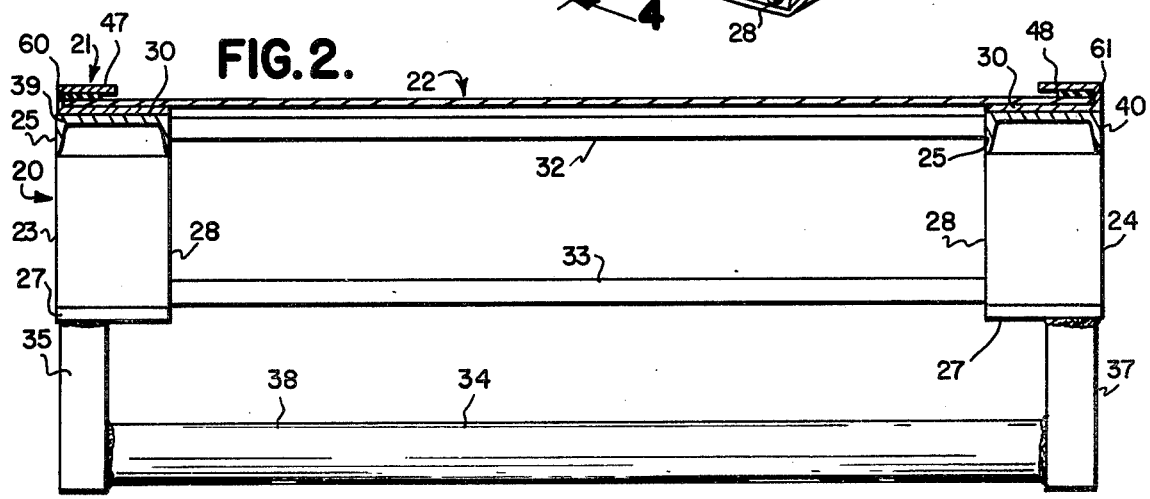

PANEL MOUNTING APPARATUS

This invention relates to devices for reflecting radiant energy.

More particularly, the present invention relates to devices having arcuate reflective surfaces for receiving and redirecting radiant energy.

In a further aspect, the instant invention concerns mounting means for detachably securing a reflective panel to a radiant energy device.

Devices having reflective panels for receiving and redirecting radiant energy are well known. One type is exemplified by the conventional radiant space heater. Herein, heat generated by a source, usually an electric element, is projected to a reflective surface which disburses and broadcasts the heat to the environment. The second basic type, having a structural similarly but a diametrically opposed function, is typified by a solar energy collector. In a solar device, the generally parallel rays from the sun are received against a reflective panel, usually parabolic, and redirected to a single source, such as a fluid carrying conduit.

The efficiency of the foregoing type of radiant reflectors is largely dependent upon the precision of the reflective panel. The reflective surface must be highly polished in order to transmit the maximum quantity of energy received. However, the panels, whether fabricated or mirrored glass, polished metal or other materials, are exceedingly susceptible to surface erosion. Surface erosion, due to sand storms and other environmental phenomenon, is of particular concern with solar energy devices. Similarly, the polish on the reflective surface of a space heater is deteriorated by stains, heat discoloration and other factors.

Many reflective panels are commonly fabricated of aluminum or stainless steel sheet stock, which has been polished on one side. Thermal expansion of such material is well known. Thin metallic material, when secured in a frame, will generally ripple and distort due to thermal expansion. The loss of the pre-set curvature of the panel disturbs the calibration of the unit with attendent loss in efficiency.

Devices of the instant type have other inherent problems. For example, a bright shiny surface which is unattended, such as a remotely placed solar collector, is an attractive target for vandalism. Vandals are invited to throw stones at, shoot at, write slogans upon and otherwise destroy the panels. This necessitates repolishing of the collector surface. However, such devices are not readily disassembled or shipped. Accordingly, the unit is out of service for an extended time and the owner suffers a financial burden, both as a result of the downtime of the unit and as a result of shipping costs for the bulky item.

It would be highly advantageous, therefore, to remedy the deficiencies inherent in the prior art devices.

Accordingly, it is an object of the present invention to provide new and useful improvements in devices for reflecting radiant energy.

Another object of the invention is the provision of ameliorated mounting means for affixing a reflective panel to a radiant energy device.

And, another object of the invention is to provide a mounting apparatus for detachably securing a reflective panel to an arcuate frame.

Yet another object of the invention is the provision of mounting means whereby the panel is free floating and relieved of stress due to thermal expansion.

Still another object of the invention is to provide means whereby a damaged panel is readily replacable.

Yet still another object of the invention is the provision of a panel and mounting combination which will facilitate convenient shipping of replacement panels.

A further object of the invention is to provide an assembly which is arranged for effective cooling of the reflective panel.

And, a further object of the invention is the provision of mounting means for the utilization of reversable panels that are polished on both sides.

And still a further object of the invention is to provide a radiant energy device, in accordance with the foregoing objectives, that is simply and economically constructed, relatively maintenance free, and conveniently usable.

Briefly, to achieve the desired objects of the instant invention in, accordance with a preferred embodiment of the instant invention, first provided is a pair of alongate guide members which are affixed in spaced apart arrangement to the concave top of the frame of a radiant energy device. Each of the guide members slideably receives a respective longitudinal edge of a flexible panel. Preferably, the edges of the panel are received in generally U-shaped grooves, which are formed in the guide members and are substantially wider than the thickness of the panel. A strip of resilient material also resides within the groove to prevent the panel from moving laterally within the groove.

In a further embodiment, a lateral guide member extends transversly between the pair of alongate guide members and slideably receives a lateral edge of the panel. The panel is held within the guide members by retention means engageable with the other lateral edge of the panel. The retention means is disengageable from the other lateral edge for removal of the panel from the frame. The retention means is biased and therefore moveable in response to pressure as a result of thermal expansion of the panel.

The foregoing and further and more specific objects and advantages of the present invention will become readily apparent to those skilled in the art from the following detailed description of a preferred embodiment thereof, taken in conjunction with the drawings in which:

FIG. 1 is a perspective view of a radiant energy device, especially including a frame, a panel, an apparatus for mounting the panel to the frame, constructed in accordance with the teachings of the instant invention;

FIG. 2 is an enlarged vertical sectional view taken along the line 2—2 of FIG. 1 and further showing details of the frame and mounting apparatus;

FIG. 3 is an enlarged fragmentary vertical sectional view taken along the line 3—3 of FIG. 1 and further illustrating the mounting apparatus engaged with a lateral edge of the panel;

Figure 4:
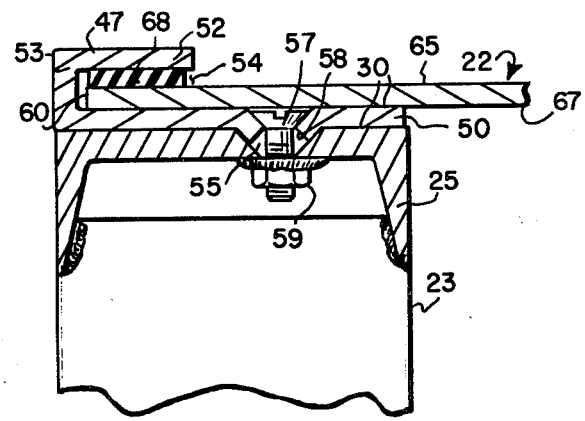
FIG. 4 is an enlarged fragmentary vertical sectional view taken along the line 4—4 of FIG. 1 and showing in greater detail the mounting apparatus in combination with a longitudinal edge of the panel.

Turning now to the drawings in which the same reference numerals indicate corresponding elements throughout the several views, attention is first directed to FIG. 1 which shows a radiant energy device embodying the principles of the instant invention and having a frame generally designated by the reference character 20. A mounting apparatus, generally designated by the reference character 21 is secured to frame 20 and holds a panel generally designated by the reference character 22.

Frame 20, as also seen in FIG. 2, is of the open skeleton type, having longitudinal structural side members 23 and 24. For purposes of orientation, side members 23 and 24 are designated left and right, respectively. Each side member 23 and 24 has a longeron 25 and a stringer 27, which are held in spaced relationship by structural box members 28. Each box member 28 has an aperture 29 bored therethrough consistent with the skeleton nature of the frame.

Preferably, side members 22 and 23, as well as the entire frame 20, is a weldment of structural metal parts, as are commercially available in ferrous metals, aluminum and other material. Box member 28 are cut to length from rectangular pipe. Stringers 27 are strip stock and longerons 25 are channel beams. As illustrated, the channel beams are inverted, the base 30 thereof effectively becoming the top of frame 20. Side members 23 and 24 are congruently arcuate about an axis perpendicular to the longitudinal axis of the side members. The radius and type of curvature, circular or parabolic for example, is at the discretion of the manufacturer in accordance with the intended use. Side members 23 and 24 are held in spaced relationship by a plurality of upper and lower cross ties 32 and 33, respectively. In accordance with a preferred method of fabrication, there exists an upper cross tie 32 and a lower cross tie 33 for each opposed pair of box members 28. For purposes of strength, cross ties 32 and 33 are tubular, either round or rectangular, and are of the same material as side members 23 and 24. Upper cross tie 32 is welded at the ends thereof to respective longerons 25. In a similar manner, lower cross tie 33 is affixed at respective ends thereof to opposed box members 28.

A mounting bracket 34 depends from proximate the center of frame 20. Mounting bracket 34 includes V-shaped metallic structural members 35 and 37 depending from side members 23 and 24, respectively. Tubular support member 38 extends tranversly of frame 20 and is secured at the ends thereof to the nethermost or apex portion. Extending between side members 23 and 24 at first lateral end 42 is a lateral brace 44 in the form of an inverted structural channel, the base 45 of which contributes to the top of frame 20, as particularly seen in FIG. 3.

With further reference to FIG. 4, mounting apparatus 21 includes a pair of elongate guide members 47 and 48 carried on the top of side members 23 and 24, respectively, and a lateral guide member 49 secured to lateral brace 44 and extending between guide members 47 and 48. Each guide member 47 and 48 includes a first side wall 50, a spaced apart second side wall 52 and a connecting wall 53, which together define a generally U-shaped channel 54.

Side wall 50, as particularly seen in FIG. 4, is substantially longer than side wall 52 and is placed against base 30 of longeron 25. Periodically spaced along longeron 25 are counterbored apertures 55. Flat head machine screw 57 extends through a corresponding aperture 58 in side wall 50 and threadedly engages weld nut 59. Due to the relatively thin cross section of side wall 50, and especially if guide member 47 is fabricated from a ductile material such as aluminum, the material immediately surrounding aperture 58 is drawn into counterbored aperture 55 in response to the tightening of flat head machine screw 57 with weld nut 59. Accordingly, the exposed surface of side wall 50 is free from upstanding obstructions.

FIG. 4 particularly illustrates guide member 47 and the attachment thereof to side member 23. Although not specifically illustrated, it will be appreciated that guide member 48 is a mirror image of guide member 47 and similarly attached to side member 24. Similarly, lateral guide member 49 is secured to lateral brace 44 and U-shaped channel 54 is continuous amoung the several guide members.

Panel 22 has first and second longitudinal edges 60 and 62, respectively, and first and second lateral edges 63 and 64, respectively. Panel 22 further includes first side 65 and second side 67. Although the thickness of panel 22 is subject to the preference of the individual manufacturer, a thickness of approximately 0.032 inches has been found to be satisfactory. Similarly, a panel of approximately three-feet wide by eight-feet long is convenient for handling and shipping purposes. Preferably, panel 22 is fabricated from aluminum or stainless steel, and since panel 22 is reversable within mounting apparatus 21, as will become apparent presently, sides 65 and 67 are polished.

Lateral edges 63 and 64 of panel 22 are received in grooves 54 of guide members 47 and 48. First lateral edge 63 is received in groove 54 within lateral guide member 49. The spacing between side walls 50 and 52 is such that groove 54 is substantially wider than the thickness of panel 22. The panel 22 is freely slideably received within mounting apparatus 21 when inserted from second lateral end 43 of frame 20. A resilient strip 68, such as fabricated from felt or a compound of foam rubber or polymer material, is in juxtaposition with panel 22 within groove 54. Resilient strip 68 maintains relatively light pressure upon panel 22, whereby panel 22 is freely moveable within groove 54, yet is restrained from vibration.

As particularly illustrated in FIG. 4, space exists between longitudinal edge 60 of panel 22 and connecting wall 53 of guide member 47. A similar space exists between panel 22 and longitudinal guide member 48. The space provides for thermal expansion of panel 22. It is not important that panel 22 be placed tightly against one of the lateral guide members inasmuch as a doubled amount of space will be present within the other guide member.

As especially seen in FIG. 3, lateral edge 63 may be placed in abutment against connecting wall 53 of lateral guide member 49, since panel 22 is free to expand in a direction toward second lateral end 43 of frame 20, as will be described presently.

Figure 5:
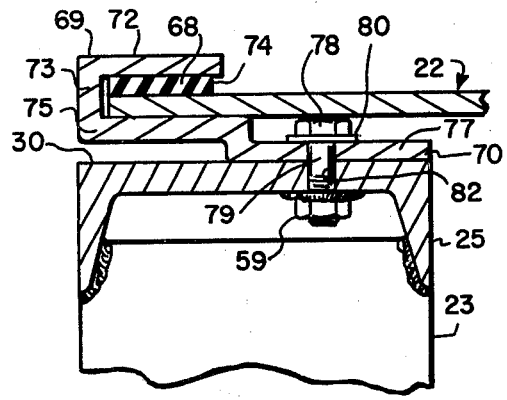
FIG. 5 is a view generally corresponding to the view of FIG. 4 and showing an alternate arrangement thereof.

FIG. 5 illustrates a modified guide member 69, which is alternately useable instead of guide members 47, 48 and 49. Guide member 69 includes a first side wall 70, a spaced apart second guide wall 72 and a connecting wall 73, which together form a groove 74 analygous to the previously described groove 54. Side wall 70 has first and second offset sections 75 and 77. The amount of offset exceeds the combined thickness of head 78 of bolt 79 and washer 80. Bolt 79 extends through aperture 82 corresponding bored through second section 77 and longeron 25. Bolt 79 is threadedly engaged and tightened with weld nut 59. The immediate embodiment eliminates the need for forming counterbored aperture 55. In view of the instant disclosure, other forms of guide rails will readily occur to those skilled in the art, as well as other forms of attachment, such as spot or fillet welding.

Figure 6:
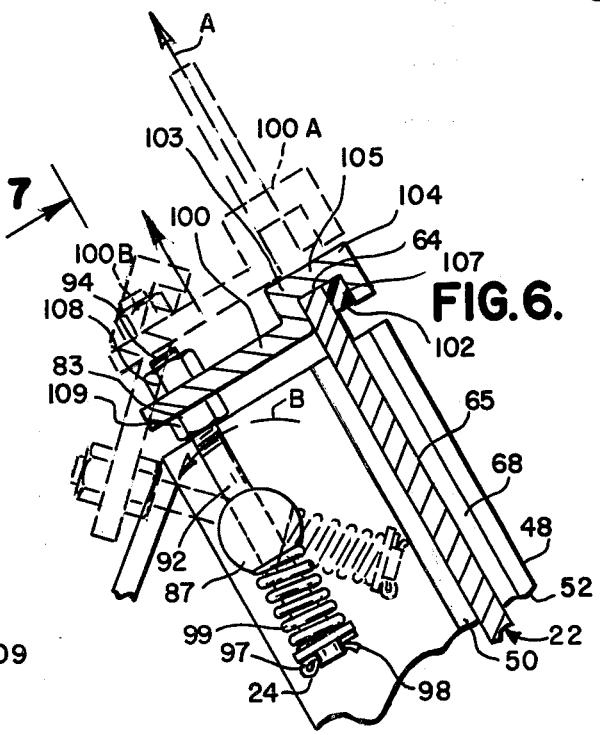
FIG. 6 is an enlarged fragmentary vertical sectional view taken along the line 6—6 of FIG. 1 and especially showing a preferred panel retention means useful in connection with the instant invention.
Figure 7:
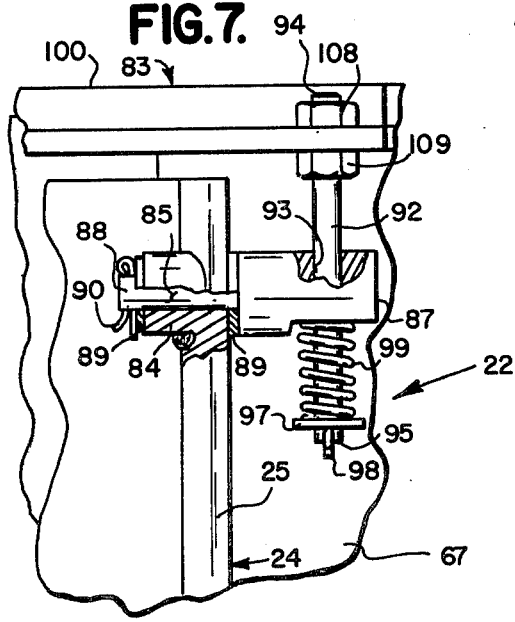
FIG. 7 is a fragmentary vertical sectional view taken along the line 7—7 of FIG. 6 and revealing additional details of the mechanism thereof.

Retention means, generally designated by reference character 83 for releasably engaging the second lateral edge 64 of panel 22 and retaining the panel within mounting apparatus 21 is illustrated in detail in FIGS. 6 and 7. A boss 84 is secured, as by welding, to the inside of the inboard leg of the channel member forming longeron 25. A cylindrical bore 85 extends through boss 84 and the leg of longeron 25. Support member 87 has a reduced diameter section 88 which is rotatably journaled within bore 85. Thrust washers 89 are placed at either end of bore 85 and support member 87 is retained by cotter pin 90 extending through a suitable bore and deformed in accordance with conventional practice.

Arm 92 is slideably disposed within aperture 93, formed through support member 87 transverse to the axis of rotation of support member 87 within bore 85. Arm 92 has a first end 94 and a second end 95 which extend beyond support member 87. Proximate first end 95 is a shoulder formed by washer 97 and cotter pin 98. Compression spring 99 encircles arm 92 and bears against support member 87 and spring 97 normally urging first end 94 toward support member 87.

Support member 87 and arm 92 form a bracket for supporting elongate retention member 100 which extends along second lateral edge 43 of frame 20. Retention member 100 is a relatively flat plate having a longitudinal recess 102 formed along one edge thereof by spaced apart first and second walls 103 and 104, and connecting wall 105. As previously described in connection with guide members 47, 48 and 49, recess 102 is sufficiently wide to receive lateral edge 64 of plate 22 and a strip of resilient material 107. Arm 92 extends through a suitable bore formed in retention member 100 and has a link thereof threaded proximate first end 94 for receiving locking nuts 108 and 109 on respective sides of retention member 100.

As will be appreciated, a mirror image to the arrangement described in connection with FIGS. 6 and 7 is carried by side member 23 and cooperates for supporting retention member 100.

Due to thermal expansion, panel 22 will expand longitudinally, bearing against lateral guide member 49 and retention member 100. In response to the thermal expansion, springs 99 are compressed and the pressure of second lateral edge 64 urges retention member 100 in the direction of arrow A, as particularly seen in FIG. 6. The position which retention member 100 may assume as result of thermal expansion of panel 22 is shown in broken outline 10A. A movement of approximately 0.125 inches will accommodate a 0.032 inch thick aluminum panel, having an overall length of eight feet. With proper selection of springs 99 the movement of retention member 100 is affected without rippling or distortion to the panel. Removal of panel 22 is readily accomplished by first moving retention member 100 in the direction of arrow A, then rotating in the direction of arrow B to the position designated by the broken outline 100B. Panel 22 is then withdrawn in the direction of arrow A. Subsequently, panel 22 is reversed and replaced or a new panel inserted in a reverse manner.

The embodiment of the instant invention herein chosen for purposes of illustration is an elongate, generally rectangular, radiant energy device having a single panel. Various modifications thereof are apparent. The teachings herein can be applied to devices having diverse appearances. In providing an alternate shape, such as square for example, a square frame can be employed to hold a substantially square panel. Alternately, two or more mounting apparati can be affixed to a single frame to hold a plurality of smaller panels. Similarly, the illustrated embodiment can be considered a modular unit and bolted or otherwise affixed adjacent to similar or identical units to provide a device of any desired size.

Various other modifications and variations of the instant embodiment will readily appear to those skilled in the art. To the extent that such modifications and variations do not depart from the spirit to the invention, they are intended to be included therein and limited only by a fair interpretation of the appended claims.

Having fully described and disclosed the instant invention and preferred embodiments thereof in such clear and concise terms as to enable those skilled in the art to understand and practice the same, the invention claimed is:

1. In a device for receiving and redirecting radiant energy, said device having an elongate arcuate frame with a concave top and having spaced apart longitudinal sides and first and second lateral ends, improvements therein for detachably mounting flexible reflective panel in juxtaposition to said top, said panel having spaced apart longitudinal edges and first and second lateral edges, said improvements including a pair of spaced apart elongate guide members carried on the top of said frame, each of said pair of guide members extending longitudinally of said frame and slideably receiving a respective longitudinal edge of said panel, a lateral guide member carried by said frame proximate the first lateral end thereof and extending between said pair of elongate guide members and slideably receiving the first lateral edge of said panel, and retention means carried proximate the second lateral end of said frame for releasably engaging the second lateral edge of said panel and retaining said panel within said guide members, said retention means including:

(a) a bracket carried by said frame and rotatable about an axis generally parallel to the second lateral end of said frame and moveable in a direction generally perpendicular to the second lateral edge of said frame;

(b) a retention member carried by said bracket and having an open groove therein for receiving the second lateral edge of said panel; and (c) biasing means normally urging said bracket in a direction generally toward said lateral guide member.

2. The device of claim 1 further including a second bracket spaced along the second lateral edge of said frame from said first mentioned bracket, said second bracket cooperating with said first mentioned bracket for supporting said retention member.

3. The device of claim 2, wherein each said bracket includes:

(a) a support member carried by said frame and rotatable about an axis generally parallel to the second lateral end of said frame;
(b) an arm having first and second ends slideably carried by said support member for movement transverse to the axis of said support member;
(c) attachment means proximate the first end of said arm for engagement with said retention member; and
(d) biasing means normally urging the first end of said arm toward said support member.

4. The device of claim 1, wherein said biasing means is yieldable in response to movement of the second lateral edge of said panel in response to thermal expansion of said panel.

* * * * *